United States Patent [19]

McSweeney et al.

[11] 3,770,463
[45] Nov. 6, 1973

[54] FLAVOR ENHANCING COMPOSITION FOR FOODSTUFFS

[75] Inventors: Daniel Robert McSweeney, Lombard; John Richard Kandl, Chicago, both of Ill.

[73] Assignee: General Foods Corporation, White Plains, N.Y.

[22] Filed: Sept. 20, 1971

[21] Appl. No.: 182,216

[52] U.S. Cl............... 426/212, 99/14, 99/100, 99/107, 99/111
[51] Int. Cl.............................................. A23l 1/26
[58] Field of Search ............... 99/14, 16, 17, 18, 99/22, 140, 145, 110, 140 R; 260/529

[56] References Cited
UNITED STATES PATENTS

| 2,444,577 | 7/1948 | Murata | 99/145 |
|---|---|---|---|
| 2,991,309 | 7/1961 | Hoglan | 99/16 |
| 2,162,047 | 6/1939 | Allen | 99/16 |
| 1,680,865 | 8/1928 | Fujii | 99/16 |
| 1,035,591 | 8/1912 | Ikeda et al. | 99/16 |
| 1,060,296 | 4/1913 | Sulzberger | 99/110 X |

FOREIGN PATENTS OR APPLICATIONS

| 9,440 | 1909 | Great Britain |
|---|---|---|

Primary Examiner—Morris O. Wolk
Assistant Examiner—Sidney Marantz
Attorney—Bruno P. Struzzi et al.

[57] ABSTRACT

An edible composition consisting essentially of salt, hydrolyzed soy and corn proteins, beef flavor and onion flavor has been found to enhance the flavor of foodstuffs in a way similar to monosodium glutamate.

5 Claims, No Drawings

FLAVOR ENHANCING COMPOSITION FOR FOODSTUFFS

SUMMARY OF THE INVENTION

Monosodium glutamate, hereafter MSG, is the most widely used flood flavor enhancer because of its ability to improve greatly the flavor notes of almost any type of food or food seasoning agent. MSG is so effective that it need only be used in small amounts to bring about a great increase in food flavor sensation. There are many other type of ingredients or combinations of ingredients which enhance food flavors.

This invention is concerned with the discovery that an edible composition, consisting essentially of, by weight, 45 percent to 55 percent hydrolyzed corn protein, 35 to 45 percent salt, 1 to 7 percent hydrolyzed soy protein, 1 to 5 percent beef flavor and 1 to 5 percent onion flavor will enhance the flavor of foodstuffs or food seasoning agents in a manner similar to MSG.

The enhancer of this invention works particularly well on meats and vegetables. The hydrolyzed proteins of corn and soy are commercially available under various tradenames; e.g., Vegamine V-84 as the corn protein and HMD 1545 as the soy protein. Beef flavor is an essential constituent and acts in combination with the salt, onion and proteins to give the flavor enhancing effect. The beef flavor may be beef extract or various combinations of ingredients which yield a beef-like flavor, such as IFF Beef Flavors comprised of vegetable and grain proteins.

The composition of this invention can be applied directly to a foodstuff to enhance its flavor characteristics, or can be used as a component in a sauce or coating to be applied to the foodstuff. The amount used will vary depending upon the degree of flavor enhancement desired and the means of application employed.

EXAMPLE I

A base mix for coating pork chops prior to baking them was prepared as below for a taste-test panel of 100 persons. One mix was prepared using 5.96% MSG and another mix was prepared without MSG using an identical amount of the flavor enhancing composition of this invention, as follows:

| Flavor Enhancer | % Composition |
|---|---|
| Hydrolyzed Corn protein | 51.1 |
| Hydrolyzed Soy Protein | 3.4 |
| Salt | 40.0 |
| Beef Flavor | 3.5 |
| Onion Powder | 2.0 |
| Coating Mix | % Composition |
| Cereal Fines | 52.32 |
| Modified Starch | 13.81 |
| Wheat Flour | 12.15 |
| Salt | 7.45 |
| Shortening | 6.07 |
| Seasoning | 1.95 |
| Color | 0.29 |
| Enhancer (Mix No. 1) | 5.96 |
| MSG (Mix No. 2) | 100.00 |

Raw pork chops were coated, one batch with Mix No. 1 and another batch with Mix No. 2, for sampling by the panel. The coated chops were baked at 400°F. unitl done. The coating mix is so formulated as to yield a tender, juicy meat product which retains as much of its natural flavor as possible during baking. The MSG in Mix No. 2 and the enhancer of Mix No. 1 and this invention, were then evaluated on the strength of their ability to yield a tasty meat product. Each panel member tasted prok chops coated with Mix No. 1 and chops coated with Mix No. 2. 56% of the panel preferred the meat coated with Mix No. 1 and the enhancer of this invention. This result indicates, at least, that the enhancer of this invention functions to heighten food flavor in a way similar to MSG, the most widely used enhancer.

EXAMPLE II

Two nearly identical sirloin steaks were broiled until medium-cooked, one steak having been sprinkled with 2.7 grams per pound of steak of the flavor-enhancing composition of Example I, and the other with an identical amount of MSG. It was observed that the former steak possessed as good if not better a beef flavor as the steak salted with MSG.

Other ingredients may be added to our enhancer composition to improve appearance or physical functionality, such as trace amounts of powdered silicon dioxide to improve flowability of the powdered enhancer composition, color, etc.; no ingredient can be added to it, however, which possesses any significant flavor aspects on its own. The essential ingredients are as described above.

We claim:

1. A food flavor-enhancing composition which consists essentially of, by weight, 45 to 55 percent hydrolyzed corn protein, 35 to 45 percent salt, 1 to 7 percent hydrolyzed soy protein, 1 to 5 percent beef flavor, and 1 to 5 percent onion flavor.

2. A foodstuff comprising fish and an amount of the food flavor-enhancing composition of claim 1.

3. A foodstuff comprising a vegetable and an amount of the food flavor-enhancing composition of claim 1.

4. A foodstuff comprising meat and an amount of the food flavor-enhancing composition of claim 1.

5. The foodstuff of claim 4 where the meat is selected from the group consisting of pork, beef and poultry.

* * * * *